(12) United States Patent
Ji

(10) Patent No.: US 6,964,212 B2
(45) Date of Patent: Nov. 15, 2005

(54) BRAKE PEDAL APPARATUS

(75) Inventor: Sang Woo Ji, Hwaseong (KR)

(73) Assignee: Hyundai Motor Company, Seoul (KR)

(*) Notice: Subject to any disclaimer, the term of this patent is extended or adjusted under 35 U.S.C. 154(b) by 32 days.

(21) Appl. No.: 10/628,721

(22) Filed: Jul. 28, 2003

(65) Prior Publication Data
US 2004/0159176 A1 Aug. 19, 2004

(30) Foreign Application Priority Data
Feb. 19, 2003 (KR) ................. 10-2003-0010245

(51) Int. Cl.⁷ ............................................. G05G 1/14
(52) U.S. Cl. ..................... 74/512; 74/560; 74/513; 180/271
(58) Field of Search ..................... 74/512, 513, 560; 180/271; G05G 1/14

(56) References Cited

U.S. PATENT DOCUMENTS

| | | | |
|---|---|---|---|
| 5,385,068 A | * | 1/1995 | White et al. .................. 74/512 |
| 5,632,184 A | * | 5/1997 | Callicutt et al. ............... 74/512 |
| 5,797,467 A | * | 8/1998 | Watanabe .................... 180/271 |
| 5,916,330 A | * | 6/1999 | Jacobson ...................... 74/512 |
| 6,186,025 B1 | * | 2/2001 | Engelgau et al. ............. 74/512 |
| 6,571,661 B1 | * | 6/2003 | Hemenway et al. .......... 74/512 |

FOREIGN PATENT DOCUMENTS

| | | | |
|---|---|---|---|
| JP | 2002-173007 | | 6/2002 |
| WO | WO 03/071374 A1 | * | 8/2003 .................. 74/512 |

* cited by examiner

Primary Examiner—Vinh T. Luong
(74) Attorney, Agent, or Firm—Morgan Lewis & Bockius LLP

(57) ABSTRACT

A brake pedal apparatus designed to prevent injury to a driver caused by the brake pedal apparatus crashing toward the ankle of the driver. A pedal arm assembly has a first pedal arm connected to the body of a vehicle. A second pedal arm has an upper end that is rotatably connected to a lower end of the first pedal arm and a lower end that is provided with a pad to which a load is applied by a driver. A driving part generates torque for rotating or fixing the second pedal arm with respect to the first pedal arm and a controller controls the driving part.

5 Claims, 3 Drawing Sheets

BRAKE PEDAL APPARATUS

FIELD OF THE INVENTION

The present invention relates to a brake pedal apparatus, and more particularly to a brake pedal apparatus for preventing injury to a driver's ankle in a car accident

BACKGROUND OF THE INVENTION

Generally, a vehicle is provided with a brake pedal assembly comprising a pedal arm and a pad, for decelerating and stopping the vehicle. A conventional brake pedal apparatus for a vehicle is configured to actuate a master cylinder by hydraulic pressure generated from force applied to the brake pedal apparatus.

Typically, a conventional brake pedal apparatus comprises a supporting bracket fixed to a dash panel and a cowl panel. A pedal assembly is rotatably connected to the supporting bracket with a hinge pin. A push rod has one end rotatably connected to the pedal assembly and the other end connected to a brake booster.

The pedal assembly typically comprises a pedal arm and a pad. If foot force is applied to the pad, the pedal arm rotates about the hinge pin fixed to the supporting bracket. Then the push rod connected to the pedal arm moves forward in so that the foot force is amplified by the brake booster and transferred to the master cylinder.

Generally, in the case of an accident occurring at the front of the vehicle, the dash panel can be crushed into the leg room of the vehicle so that the brake pedal assembly injures the driver's ankle.

In an attempt to prevent injury to the driver's ankle, a breakaway pedal is disclosed in U.S. Pat. No. 6,186,025 of Engelgau et al. issued Feb. 13, 2001. The breakaway pedal is disclosed as an assembly having a rebound mechanism for moving the pedal arm in response to an applied load greater than the normal operating load. However, because the operation of the apparatus depends on the applied load, the accuracy in the control of the brake pedal is not sufficiently reliable. Furthermore, after an impact of the car accident triggers the operation of the breakaway pedal, it is impossible for a driver to re-control the brake pedal according to his/her intention, so he/she could not actively control the vehicle in a preparation against an additional crash.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention comprises a pedal arm assembly having a first pedal arm connected to a vehicle body, and a second pedal arm with an upper end rotatably connected to a lower end of the first pedal arm and a lower end provided with a pad to which a load is applied by a driver. A driving part generates torque for selectively holding the second pedal arm with respect to the first pedal arm. A controller controls the driving part.

Preferably, the driving part comprises an electromagnet provided at the lower end of the first pedal arm; a permanent magnet provided at the upper end of the second pedal arm with a pole opposite to that of the electromagnet; a supporting part fixed to the lower end of the pedal arm; a piston provided to the lower end of the first pedal arm so as to rotate the second pedal arm forward by pressure therefrom; a spring interposed between the supporting part and the piston for moving the piston; and a solenoid switch connecting or disconnecting an electric current supplied to the electromagnet.

Preferably, the brake pedal apparatus further comprises a first sensor for detecting an impact to the front of the vehicle, and a second sensor mounted on the pad for determining contact between the pad and the driver's foot, wherein the controller controls the driving part based on the signals from the first sensor and the second sensor.

Preferably, the controller turns off the solenoid switch when an impact to the front of the vehicle is detected while contact between the pad and the driver's foot is not detected. The controller turns on the solenoid switch if an impact to the front of the vehicle is not detected, or if contact between the pad and driver's foot is detected.

Preferably, the second sensor can be a photo diode.

In a further alternative embodiment of the present invention, a brake pedal apparatus may comprise a controller, at least one sensor, a brake pedal assembly and a linkage. The sensor communicates with the controller and generates a signal in response to an impact, typically a front end impact. The brake pedal assembly includes first and second, pivotably linked, arms. A brake pad may be disposed on one end of one arm and the opposite end of the other arm is pivotably fixed to the car body. The linkage operatively joins the first and second arms and is responsive to the controller to selectively rigidly link or permit pivoting between the arms in response to a signal from the sensor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will hereinafter be described in detail with reference to the accompanying drawings.

Figure 1:
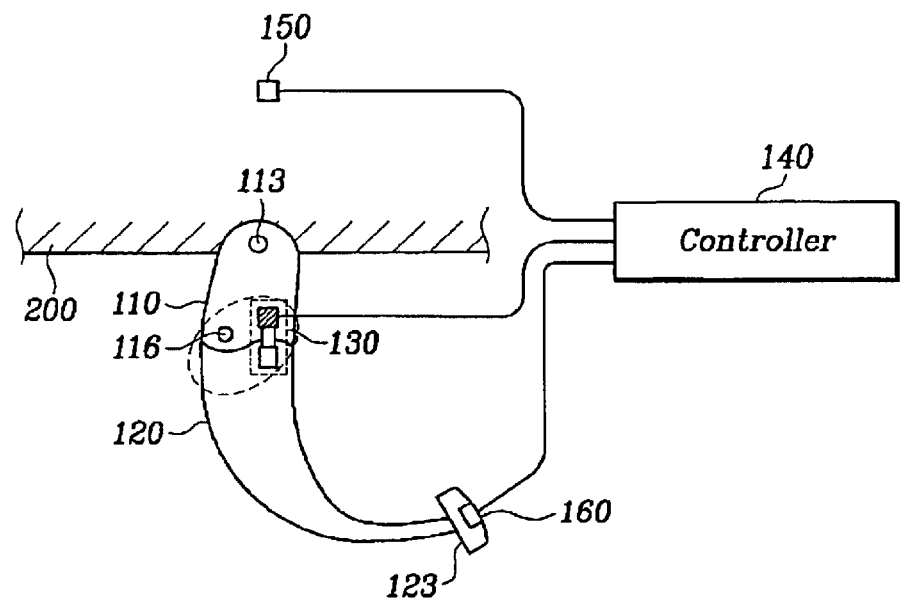
FIG. 1 is a schematic diagram showing a fixed state of a brake pedal apparatus according to a preferred embodiment of the present invention.
Figure 3:
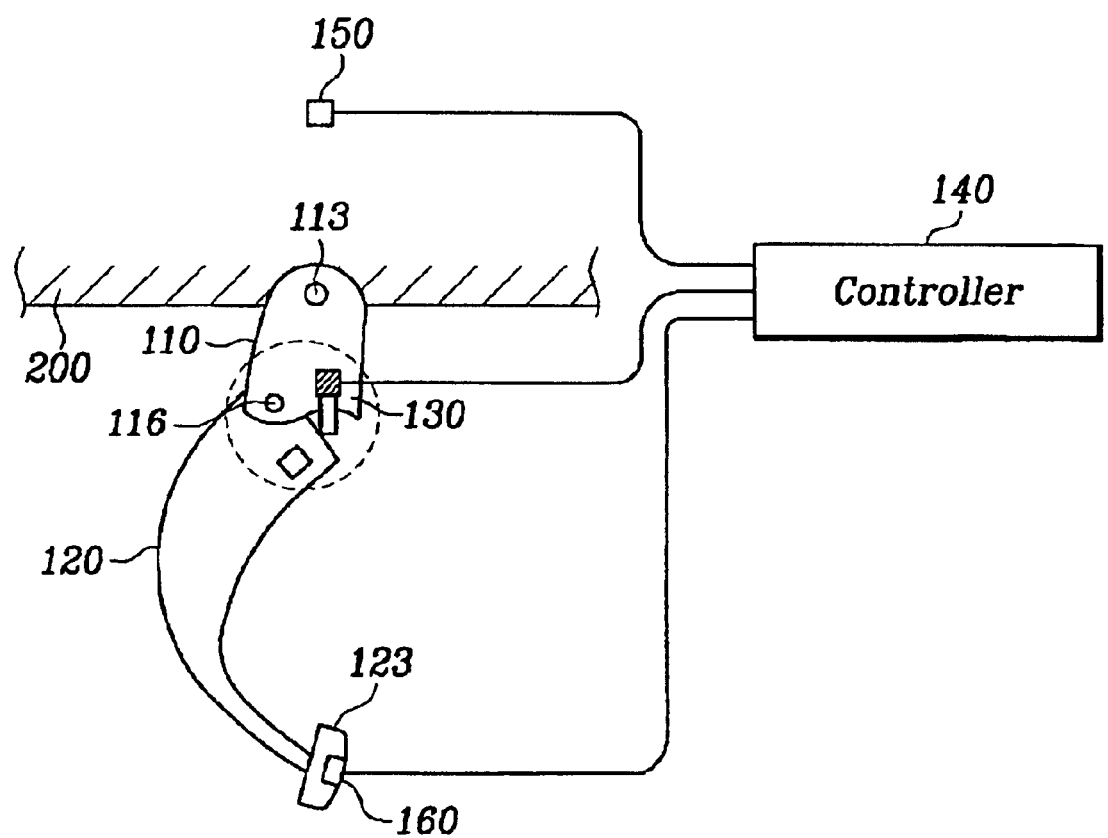
FIG. 3 is a schematic diagram showing a rotated state of a brake pedal apparatus according to a preferred embodiment of the present invention.

As shown in FIG. 1 and FIG. 3, a first pedal arm 110 is rotatably connected to a vehicle body with a hinge pin 113, and a second pedal arm 120 is rotatably connected to a lower end of the first pedal arm 110 with a hinge pin 116. The second pedal arm is provided with a pad 123, which is operated by a driver's foot, on a lower end of the second pedal arm 120. A driving part 130, which generates torque to hold the first pedal arm 110 with respect to the second pedal arm 120, is formed at the lower end of the first pedal arm 110 and the upper end of the second pedal arm 120. Driving part 130 thus forms an operative linkage between the two arms.

Figure 2:
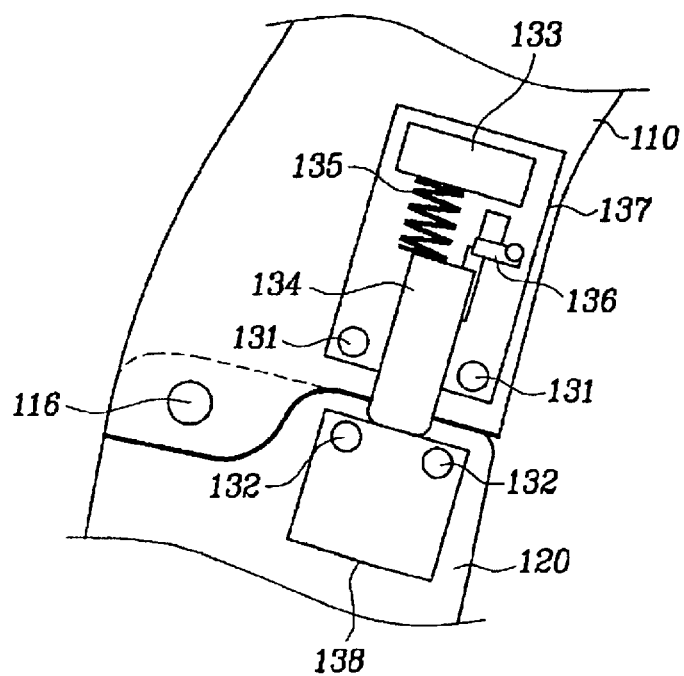
FIG. 2 is a detailed side view of a driving part in a fixed state of a brake pedal apparatus according to a preferred embodiment of the present invention.
Figure 4:
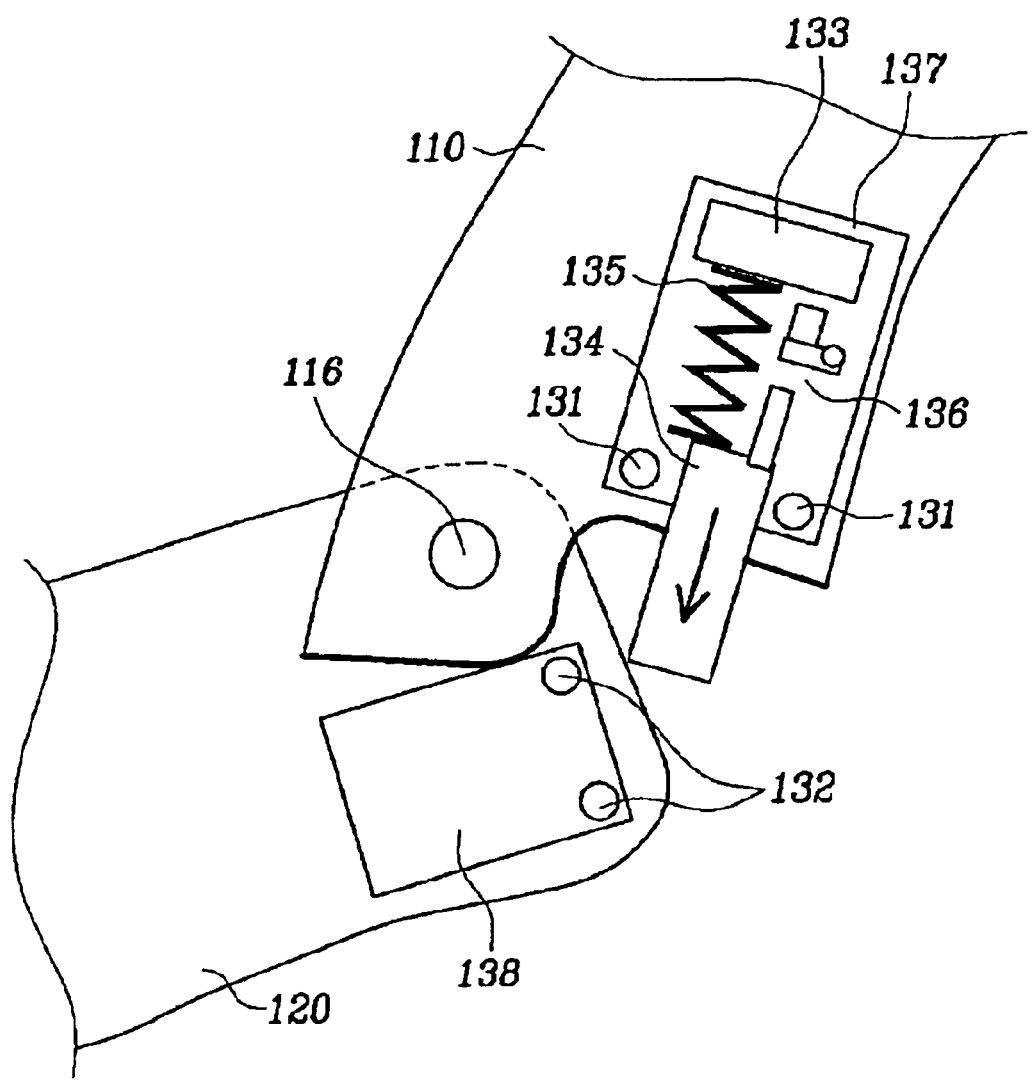
FIG. 4 is a detailed side view of a driving part in a rotated state of a brake pedal apparatus according to a preferred embodiment of the present invention.

As shown in FIG. 2 and FIG. 4, an electromagnet 131 and a solenoid switch 136, that controls whether electric current is supplied to the electromagnet, are mounted on the lower end of the first pedal arm 110. A permanent magnet 132, having its polarity opposite to that of the electromagnet 131, is mounted on the upper end of the second pedal arm 120. Accordingly, in the case that the solenoid switch 136 connects the electromagnet 131 to the electric current, magnetic attraction is activated between the permanent magnet 132 and the electromagnet 131 so that the second pedal arm 120 is unrotatably fixed to the first pedal arm 110.

Preferably, the magnetic attraction between the permanent magnet 132 and the electromagnet 131 is set to resist a normal brake force of about 200N when the brake is operated by the driver.

Furthermore, the driving part 130 has a supporting part 133, a piston 134, and a spring 135. The supporting part 133 is mounted on the lower end of the first pedal arm 110 for supporting the spring 135. The spring is interposed between the supporting part 133 and the piston 134. Accordingly, in the fixed state, when the solenoid switch 136 is on, the spring 135 is compressed by the attraction between the permanent magnet 132 and the electromagnet 131, and the first pedal arm 110 and the second pedal arm 120 rotate about the hinge pin 113 as a unit. However, in the rotating state when the solenoid switch 136 is off, the expansion force of the spring 135 causes the piston 134 to extend against the second pedal arm 120 resulting in the rotation of the second pedal arm 120 about the hinge pin 116.

The solenoid switch 136 is controlled by a controller 140. A first sensor 150 is provided to the front of the vehicle for detecting an impact, and a second sensor 160 is mounted on the pad 123 for detecting contact between the pad 123 and the driver's foot. Signals from the first sensor 150 and the second sensor 160 are transferred to the controller 140 so that the controller 140 controls the solenoid switch 136 based on the signals so as to connect or disconnect the electric current. Preferably, the first sensor 150 can be an air bag sensor, and the second sensor 160 can be a photo diode.

When impact on the front of the vehicle is detected and the contact between the pad 123 and the driver's foot is not detected, the controller controls the solenoid switch 136 to be off by disconnecting the electric current to the electromagnet 131. Accordingly, the second pedal arm 120 rotates forward about the hinge pin 116 so that injury to the driver's ankle is prevented.

However, if impact on the front of the vehicle is not detected or if contact between the pad 123 and the driver's foot is detected, the controller 140 controls the solenoid switch 136 to be on by connecting the electric current to the electromagnet 131. Accordingly, the driver can operate the brake pedal to decelerate or stop the vehicle.

The brake pedal apparatus of the present invention can prevent injury to the driver caused by the brake pedal apparatus crashing down on the ankle of the driver.

Furthermore, the second sensor mounted on the pad detects contact between the pad and the driver's foot. Accordingly, if the driver operates the brake pedal in order to avoid an accident or an additional crash, the brake pedal can be operated without breaking While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A brake pedal apparatus comprising
   a pedal arm assembly having a first pedal arm connected to a vehicle body, and a second pedal arm with an upper end rotatably connected to a lower end of the first pedal arm and a lower end provided with a pad to that receives a load;
   a driving part configured to generate torque for selectively holding the second pedal arm with respect to the first pedal arm; and
   a controller controlling the driving part, wherein the driving part comprises:
   an electromagnet provided to the lower end of the first pedal arm;
   a permanent magnet provided to the upper end of the second pedal arm with a pole opposite to that of the electromagnet;
   a supporting part fixed to the lower end of the first pedal arm;
   a piston provided to the lower end of the first pedal arm to rotate the second pedal arm forward by pressure therefrom;
   a spring interposed between the supporting part and the piston for moving the piston; and
   a solenoid switch connecting or disconnecting an electric current supplied to the electromagnet.

2. The apparatus of claim 1, further comprising:
   a first sensor for detecting an impact to the front of the vehicle; and
   a second sensor mounted on the pad for determining contact between the pad and a driver's foot, wherein the controller controls the driving part based on the signals from the first sensor and the second sensor.

3. The apparatus of claim 2, wherein:
   the controller turns off the solenoid switch when an impact to the front of the vehicle is detected while contact between the pad and the driver's foot is not detected; and the controller turns on the solenoid switch if an impact to the front of the vehicle is not detected, or if contact between the pad and driver's foot is detected.

4. The apparatus of claim 2, wherein the second sensor is a photo diode.

5. A brake pedal, comprising:

a controller;

at least one sensor communicating with said controller; said sensor generating a signal in response to an impact;

a brake pedal assembly including first and second pivotably linked arms; and a linkage operatively joining said first and second arms, said linkage responsive to the controller to selectively rigidly link or permit pivoting between said arms in response to said signal from said sensor, wherein said linkage comprises:

an electromagnet provided to the lower end of the first pedal arm;

a permanent magnet provided to the upper end of the second pedal arm with a pole opposite to that of the electromagnet;

a supporting part fixed to the lower end of the first pedal arm;

a piston provided to the lower end of the first pedal arm to rotate the second pedal arm forward by pressure therefrom;

a spring interposed between the supporting part and the piston for moving the piston; and a solenoid switch connecting or disconnecting an electric current supplied to the electromagnet.

* * * * *